(12) United States Patent
Lin et al.

(10) Patent No.: US 12,148,884 B2
(45) Date of Patent: Nov. 19, 2024

(54) ADDITIVE FOR BATTERY ELECTROLYTE, LITHIUM ION BATTERY ELECTROLYTE, AND LITHIUM ION BATTERY

(71) Applicant: SHENZHEN BAK POWER BATTERY CO., LTD., Shenzhen (CN)

(72) Inventors: Jian Lin, Shenzhen (CN); Xiaoyun Zhan, Shenzhen (CN); Weifeng An, Shenzhen (CN); Lu Miao, Shenzhen (CN)

(73) Assignee: SHENZHEN BAK POWER BATTERY CO., LTD., Guangdong (CN)

( * ) Notice: Subject to any disclaimer, the term of this patent is extended or adjusted under 35 U.S.C. 154(b) by 413 days.

(21) Appl. No.: 16/963,791

(22) PCT Filed: Aug. 21, 2018

(86) PCT No.: PCT/CN2018/101585
§ 371 (c)(1),
(2) Date: Jul. 21, 2020

(87) PCT Pub. No.: WO2020/037504
PCT Pub. Date: Feb. 27, 2020

(65) Prior Publication Data
US 2020/0365943 A1    Nov. 19, 2020

(51) Int. Cl.
| | | |
|---|---|---|
| H01M 10/05 | (2010.01) | |
| C07F 7/10 | (2006.01) | |
| H01M 4/50 | (2010.01) | |
| H01M 4/505 | (2010.01) | |
| H01M 4/52 | (2010.01) | |
| H01M 4/525 | (2010.01) | |
| H01M 10/0525 | (2010.01) | |
| H01M 10/0567 | (2010.01) | |

(52) U.S. Cl.
CPC ........... *H01M 10/0567* (2013.01); *C07F 7/10* (2013.01); *H01M 4/505* (2013.01); *H01M 4/525* (2013.01); *H01M 10/0525* (2013.01); *H01M 2300/004* (2013.01)

(58) Field of Classification Search
None
See application file for complete search history.

(56) References Cited

U.S. PATENT DOCUMENTS

| | | |
|---|---|---|
| 9,923,241 B2 | 3/2018 | Yang et al. |
| 2006/0269846 A1 | 11/2006 | Xu et al. |

FOREIGN PATENT DOCUMENTS

| | | | | |
|---|---|---|---|---|
| CN | 102244296 A | 11/2011 | | |
| CN | 103579675 A | 2/2014 | | |
| JP | 200223152 | * 8/2000 | ............ | H01M 10/05 |
| JP | 2000223152 A | 8/2000 | | |
| KR | 20080110404 | * 12/2008 | ........ | H01M 10/0525 |
| KR | 20080110404 A | 12/2008 | | |
| KR | 1020160076192 | * 6/2016 | .......... | H01M 10/052 |

OTHER PUBLICATIONS

International Search Report for Application No. PCT/CN2018/101585.
Writen Opinion for Application No. PCT/CN2018/101585.
English Translation to International Search Report for Application No. PCT/CN2018/101585.
Korea Office Action received for Korea Application No. 10-2020-7022243; Application Filing Date: Jul. 30, 2020; Date of Dispatch: Apr. 25, 2022; 17 pages, with English Translation.
Decision to Grant dated Mar. 14, 2022; JP Application No. 2020-562808; 2 pages (English translation).
Decision to Grant dated Mar. 14, 2022; JP Application No. 2020-562808; 3 pages (non-English).
Notice of Final Rejection dated Oct. 25, 2022; KR Application No. 10-2020-7022243; 4 pages (non-English).
Notice of Final Rejection dated Oct. 25, 2022; KR Application No. 10-2020-7022243; 5 pages (English translation).
Notice of Refusal dated Aug. 10, 2021; JP Application No. 2020-562808; 2 pages (English translation).
Notice of Refusal dated Aug. 10, 2021; JP Application No. 2020-562808; 2 pages (non-English).

* cited by examiner

*Primary Examiner* — Barbara L Gilliam
*Assistant Examiner* — Angela J Martin
(74) *Attorney, Agent, or Firm* — CANTOR COLBURN LLP (57) ABSTRACT

An additive for battery electrolyte, the additive at least including a structure represented by formula I or formula II as shown below,

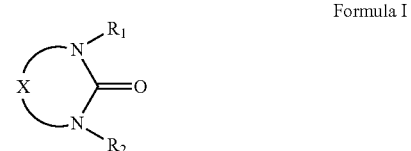

Formula I

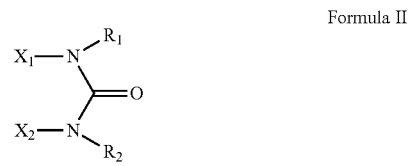

Formula II in formula I, $R_1$ and $R_2$ are independently selected from silicon-containing groups, and X is selected from organic groups with carbon atoms of 2 to 20; and
in formula II, $R_1$ and $R_2$ are independently selected from silicon-containing groups, and $X_1$ and $X_2$ are independently selected from organic groups with carbon atoms of 2 to 20.

15 Claims, 1 Drawing Sheet

ADDITIVE FOR BATTERY ELECTROLYTE, LITHIUM ION BATTERY ELECTROLYTE, AND LITHIUM ION BATTERY

CROSS-REFERENCE TO RELATED APPLICATIONS

This application is a National Stage of PCT Application No. PCT/CN2018/101585 filed on Aug. 21, 2018, the contents of which are incorporated herein by reference thereto.

BACKGROUND

Technical Field

The present application relates to the technical field of lithium ion battery, in particular, to an additive for a battery electrolyte, a lithium ion battery electrolyte and a lithium ion battery.

Description of Related Art

Lithium-ion secondary battery is the most competitive battery of the new generation, known as "green and environmentally friendly energy", and is the preferred technology for solving contemporary environmental pollution and energy problems. In recent years, lithium ion secondary batteries have achieved great success in the field of high-energy batteries, but consumers still expect batteries with higher overall performance to be available, which depends on the research and development of new electrode materials and electrolyte system. At present, electronic digital products such as smart phones and tablet computers have increasingly higher requirements on battery energy density, making it difficult for commercial lithium-ion secondary batteries to meet the requirements. There are two ways to improve the energy density of the battery: firstly, choose positive electrode and negative electrode materials with high capacity and high pressure; secondly, increase the working voltage of the battery.

Pure silicon negative electrodes have a theoretical gram capacity of up to 4200 mAh/g. The pure silicon negative electrodes are used as anodes for lithium-ion secondary batteries. Due to the volume effect, battery swelling and pole piece powdering are severe, and cycle performance is poor. In addition, silicon-based materials have poor conductivity, resulting in poor battery low temperature performance. People consider combining the silicon and carbon materials to form silicon-carbon composite materials, which can greatly increase the specific capacity and conductivity of the material, and reduce the volume effect of silicon-based materials to a certain extent. The silicon-carbon composite material is matched with a high-capacity high-nickel positive electrode, and the energy density can reach above 300 Wh/Kg. An electrolyte that matches with silicon-carbon composite material has also emerged, and silicon-carbon composite material has become a hot spot in the research of lithium ion secondary battery electrolyte.

Fluoroethylene carbonate can form a uniform and stable SEI film on the surface of the silicon-carbon negative electrode. Due to the particularity of the silicon-carbon negative electrode material (battery swelling and pole piece powdering are serious), its electrolyte system often needs more film forming additive than that in the graphite negative electrode system. The film forming additive usually needs to use a large amount of fluoroethylene carbonate. Fluoroethylene carbonate is easily decomposed in a high-temperature environment or a high-nickel positive electrode battery system, which cannot meet the requirements for high-temperature battery application. The application of fluoroethylene carbonate alone has various drawbacks. In order to solve the problem of inflation of lithium ion secondary batteries containing fluoroethylene carbonate during high temperature storage, CN201110157665 adds organic dinitriles (NC—$(CH_2)_n$—CN, where n=2~4) to the electrolyte to suppress inflation. US 2008/0311481A1 discloses an ether/aryl compound containing two nitrile groups, which can improve the inflation of the battery under high voltage and high temperature conditions and improve the storage performance at high temperature. However, the application of nitrile compounds to the ternary high-nickel positive electrode material system will increase the battery polarization and seriously deteriorate the cycle performance and low temperature characteristics.

The embodiments of the present application provide an additive for a battery electrolyte, a lithium-ion battery electrolyte, and a lithium-ion battery, which aim to solve the problem that the electrolyte is oxidized and decomposed in the existing lithium-ion battery under high temperature conditions, which results in that the high-temperature storage performance and the low-temperature discharge performance cannot be achieved simultaneously.

SUMMARY

In order to achieve the above-mentioned objective of the application, the technical solution adopted by the present application is as following:

An additive for a battery electrolyte is provided. The additive at least comprises a structure represented by formula I or formula II as shown below, Formula I Formula II In formula I, $R_1$ and $R_2$ are independently selected from silicon-containing groups, and X is selected from organic groups with carbon atoms of 2 to 20;

In formula II, $R_1$ and $R_2$ are independently selected from silicon-containing groups, and $X_1$ and $X_2$ are independently selected from organic groups with carbon atoms of 2 to 20.

Optionally, the $R_1$ and $R_2$ are independently selected from trimethylsilyl and t-butyldimethylsilyl.

Optionally, X is selected from methylene-containing organic groups with carbon atoms of 2 to 6, carbonyl-containing organic groups with carbon atoms of 2 to 20, phenyl-containing organic groups with carbon atoms of 6 to 20, and heteroatom-containing organic groups with carbon atoms of 2 to 20.

Optionally, X is selected from —$(CH_2)_n$—, —$C(CH_3)_2CO$—, —$C(Ph)_2$-, —$CH_2CH$=$CHCH_2$—, —$(CH_2)_nCO$—, -PhCO—, -Ph$(CH_2)_nCO$—,

—C(C$_2$H$_5$)$_2$CO—, —COC(C$_3$H$_7$)(C$_3$H$_5$)CO—, —C(Ph)[PhOSi(CH$_3$)$_2$]CO—, —COC(C$_3$H$_7$)(C$_2$H$_5$)CO—, —COC(C$_4$H$_9$)(C$_3$H$_5$)CO—, —COC(C$_5$H$_{11}$)(C$_2$H$_5$)CO—, and —COC(Ph)(C$_2$H$_5$)CO—, in which the value of n is a positive integer of 1-6.

Optionally, X$_1$ and X$_2$ are independently selected from an alkyl group with carbon atoms of 1 to 5, fluoroalkyl with carbon atoms of 1 to 5, phenyl, tolyl, trifluoromethylphenyl, naphthyl, and benzoyl.

Optionally, the formula I is at least one compound selected from the following structures:

-continued and

Optionally, the formula II is at least one compound selected from the following structures.

It is further provided a lithium ion battery electrolyte. The electrolyte includes a non-aqueous organic solvent, a lithium salt, and an additive, where the additive is the additive for a battery electrolyte Optionally, the sum of the mass percentages of the formula I and the formula II is 0.05% to 2% based on the total mass of the electrolyte as 100%.

Optionally, the additive further includes at least one selected from fluoroethylene carbonate, vinylene carbonate, 1,3-propane sulfone of lactone, 1,4-butane sulfone of lactone, 1,3-propene sulfone of lactone, vinyl sulfate, and allyl sulfate.

Optionally, the sum of the mass percentage of the additive is less than or equals to 15% based on the total mass of the electrolyte as 100%.

Optionally, the non-aqueous organic solvent includes at least one selected from ethylene carbonate, propylene carbonate, butylene carbonate, dimethyl carbonate, diethyl carbonate, ethyl methyl carbonate, methyl propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, and ε-caprolactone.

Optionally, the sum of mass percentage of the non-aqueous organic solvent is 55% to 75% based on the total mass of the electrolyte as 100%.

It is further provided a lithium ion battery. The lithium ion battery comprises a positive electrode, a negative electrode, a separator, and an electrolyte, and the electrolyte is the lithium ion battery electrolyte Optionally, the active material of the positive electrode is a transition metal oxide; the active material of the negative electrode is graphite, a composite material containing Si or lithium titanate.

Optionally, the transition metal oxide is $LiNi_xCo_yMn_zL_{(1-x-y-z)}O_2$, where L is one selected from the group consisting of Al, Sr, Mg, Ti, Ca, Zr, Zn, Si and Fe, the values of x, y and z satisfy: $0 \leq x < 1$, $0 < y \leq 1$, $0 \leq z < 1$, and $0 < x+y+z \leq 1$.

The lithium ion battery electrolyte provided by the present application contains at least the additive with structure as shown in Formula I or Formula II. The structure shown in Formula I and Formula II contains an imidazolone structure (one N atom is attached to each side of the carbonyl carbon). On the one hand, the carbonyl group in the imidazolone structure can react with $PF_5$ (a decomposition product of $LiPF_6$), which can be preferentially reduced to form a low-impedance SEI film on the negative electrode to improve the low-temperature characteristics and power characteristics of the lithium-ion battery; on the other hand, the N atoms in the imidazolone structure contain lone pairs of electrons, which easily lose electrons at the battery positive electrode to oxidize into a protective film, inhibit the oxidative decomposition of the electrolyte at the positive electrode, and improve the high-temperature storage performance of the lithium ion battery. In addition, the silicon-containing groups in $R_1$ and $R_2$ can undergo hydrolysis or polymerization with HF and $H_2O$ containing active proton hydrogen in the electrolyte to achieve the purpose of removing $H_2O$ and suppressing HF, thereby increasing the thermal stability of $LiPF_6$ and improving battery high temperature performance. In summary, the present application provides an additive for a battery electrolyte containing at least an additive of the structure shown in formula I or formula II, which can form a low-impedance protective film on the surface of the electrode (positive electrode and negative electrode), which can suppress the electrode and electrolyte side reaction, reduce the interface impedance, achieve both high and low temperature performance (with good low temperature discharge performance, as well as good cycle performance and high temperature storage performance), improve the overall output performance of lithium ion batteries.

The lithium ion battery electrolyte provided by the present application contains the additive for a battery electrolyte described in the present application, which can form a low-impedance protective film on the surface of the electrodes (positive electrode and negative electrode) to suppress the side reaction between the electrode and the electrolyte and reduce the interface impedance, achieve both high and low temperature performance (with good low temperature discharge performance, as well as good cycle performance and high temperature storage performance) and improve the overall output performance of lithium-ion batteries.

The lithium ion battery provided by the present application, because the lithium ion battery contains the lithium ion battery electrolyte of the present application, can significantly improve the cycle performance and low temperature discharge performance of the lithium ion battery and improve the overall output performance of the lithium ion battery.

DETAILED DESCRIPTION OF THE EMBODIMENTS

In order to make the technical problems, technical solutions and beneficial effects to be solved by the present application clearer, the present application will be further described in detail in conjunction with the embodiments below. It should be understood that the specific embodiments described herein are only used to explain the present application, and are not intended to limit the present application.

In the description of the present application, it should be understood that the terms of "first" and "second" are used for description purposes only, and cannot be understood as indicating or implying relative importance or implicitly indicating the number of technical features indicated. Thus, the features defined as "first" and "second" may explicitly or implicitly include one or more of the features. In the description of the present application, the meaning of "a plurality of" is two or more, unless otherwise specifically limited.

An additive for a battery electrolyte is provided by embodiments of the present application. The additive at least comprises a structure represented by formula I or formula II as shown below, in formula I, $R_1$ and $R_2$ are independently selected from silicon-containing groups, and X is selected from organic groups with carbon atoms of 2 to 20; and in formula II, $R_1$ and $R_2$ are independently selected from silicon-containing groups, and $X_1$ and $X_2$ are independently selected from organic groups with carbon atoms of 2 to 20.

The lithium ion battery electrolyte provided by the present application contains at least the additive with structure as shown in formula I or formula II. The structure shown in formula I and formula II contains an imidazolone structure (one N atom is attached to each side of the carbonyl carbon). On the one hand, the carbonyl group in the imidazolone structure can react with $PF_5$ (a decomposition product of $LiPF_6$), which can be preferentially reduced to form a low-impedance SEI film on the negative electrode to improve the low-temperature characteristics and power characteristics of the lithium-ion battery; on the other hand, the N atoms in the imidazolone structure contain lone pairs of electrons, which easily lose electrons at the battery positive electrode to oxidize into a protective film, inhibit the oxidative decomposition of the electrolyte at the positive electrode, and improve the high-temperature storage performance of the lithium ion battery. In addition, the silicon-containing groups in $R_1$ and $R_2$ can undergo hydrolysis or polymerization with HF and $H_2O$ containing active proton hydrogen in the electrolyte to achieve the purpose of removing $H_2O$ and suppressing HF, thereby increasing the thermal stability of $LiPF_6$ and improving battery high temperature performance. In summary, the present application provides an additive for a battery electrolyte containing at least an additive of the structure shown in formula I or formula II, which can form a low-impedance protective film on the surface of the electrode (positive electrode and negative electrode), which can suppress the electrode and electrolyte side reaction, reduce the interface impedance, achieve both high and low temperature performance (with good low temperature discharge performance, as well as good cycle performance and high temperature storage performance), improve the overall output performance of lithium ion batteries.

In the embodiments of the present application, the additive is mainly used to improve film-forming performance during the first charge and discharge.

Formula I is a cyclic structure and formula II is a linear structure, but both formula I and formula II contain an imidazolone structure. In addition, the $R_1$ and $R_2$ of the structures shown in formula I and formula II are independently selected from silicon-containing groups, thereby ensuring the realization of the above technical effects.

Optionally, the silicon-containing group is a silane group. Specifically optional, the $R_1$ and $R_2$ are independently selected from trimethylsilyl and t-butyldimethylsilyl. $R_1$ and $R_2$ are selected from additives of trimethylsilyl and t-butyldimethylsilyl, which have more excellent effects in improving the cycle performance, high temperature storage performance, and low temperature discharge performance of lithium ion batteries.

In the formula I of embodiment of the present application, X is selected from organic groups with carbon atoms of 2 to 20. On the one hand, X is an organic group that does not generate active protons, thus avoiding the impact of protons on battery performance; on the other hand, organic groups with carbon atoms of 2 to 20 have a suitable molecular structure size and good compatibility with non-aqueous organic solvent. If X has too many carbon atoms, it will not only reduce its dissolution performance, but because of too large steric hindrance, it will also cover part of the reaction site, increase the difficulty of the reaction, reduce the reaction activity, and ultimately, affect the formation of solid electrolyte interphase film (SEI).

Optionally, X is selected from methylene group-containing organic groups with carbon atoms of 2 to 6, carbonyl group-containing organic groups with carbon atoms of 2 to 20, benzene-containing organic group with carbon atoms of 6 to 20, and the heteroatom-containing organic group with carbon atoms of 2 to 20. The optional X group has a suitable space structure and good reactivity with the positive and negative electrodes, which is beneficial to form a low-impedance SEI film on the positive and negative electrodes, improve the low-temperature characteristics and power characteristics of the lithium ion battery, suppress the oxidative decomposition of positive electrodes and improve the high-temperature storage performance of lithium-ion batteries. The methylene-containing organic groups with carbon atoms of 2 to 6 include but are not limited to —$(CH_2)_n$—, where the value of n ranges from a positive integer of 1 to 6; the number of carbon atoms is 2-20 carbonyl-containing organic groups include but are not limited to —$C(CH_3)_2CO$—, —$(CH_2)_nCO$—, -PhCO—, -Ph$(CH_2)_n$CO—, —$C(C_2H_5)_2CO$—, —$COC(C_3H_7)(C_3H_5)$CO—, —$C(Ph)[PhOSi(CH_3)_2]CO$—, —$COC(C_3H_7)(C_2H_5)$CO—, —$COC(C_4H_9)(C_3H_5)CO$—, —$COC(C_5H_{11})(C_2H_5)$CO—, —$COC(Ph)(C_2H_5)CO$—, where the value of n is a positive integer of 1-6; the phenyl-containing organic group with carbon atoms of 6 to 20 includes but not limited to -PhCO—, -Ph(CH$_2$)$_n$CO—, —C(Ph)[PhOSi(CH$_3$)$_2$]CO—, —COC(Ph)(C$_2$H$_5$)CO—, where the value range of n is a positive integer of 1-6; the heteroatom-containing organic group with carbon atoms of 2 to 20 includes but not limited to —C(Ph)[PhOSi(CH$_3$)$_2$]CO—, or organic groups containing N, S, O. Among them, the introduction of silicon atoms can strengthen the effect of "hydrolysis or polymerization reaction with HF and H$_2$O containing active proton hydrogen in the electrolyte to achieve the purpose of removing H$_2$O and suppressing HF, thereby improving the thermal stability of LiPF6". Optionally, X is selected from —(CH$_2$)$_n$—, —C(CH$_3$)$_2$CO—, —C(Ph)$_2$-, —CH$_2$CH=CHCH$_2$—, —(CH$_2$)$_n$CO—, -PhCO—, -Ph(CH$_2$)$_n$CO—, —C(C$_2$H$_5$)$_2$CO—, —COC(C$_3$H$_7$)(C$_3$H$_5$)CO—, —C(Ph)[PhOSi(CH$_3$)$_2$]CO—, —COC(C$_3$H$_7$)(C$_2$H$_5$)CO—, —COC(C$_4$H$_9$)(C$_3$H$_5$)CO—, —COC(C$_5$H$_{11}$)(C$_2$H$_5$)CO—, —COC(Ph)(C$_2$H$_5$)CO—, where the value of n is a positive integer of 1-6.

Specifically optional, the formula I is at least one compound selected from the following structures:

The compound as shown in optional formula I is an additive of lithium ion battery electrolyte, has a more excellent effect in improving the cycle performance, high temperature storage performance and low temperature discharge performance of lithium ion battery.

In formula II of the embodiment of the present application, $X_1$ and $X_2$ are independently selected from organic groups with carbon atoms of 2 to 20. On the one hand, $X_1$ and $X_2$ are organic groups that do not generate active protons, thus avoiding the impact of protons on battery performance; on the other hand, the organic groups with carbon atoms of 2 to 20 have a suitable molecular structure size and good compatibility with non-aqueous organic sol- vent. If the number of carbon atoms of $X_1$ and $X_2$ is too large, it will not only reduce its dissolution performance, but because of excessive steric hindrance, it will also cover part of the reaction site, increase the difficulty of the reaction, reduce the reaction activity, and ultimately, affect the formation of solid electrolyte interphase film (SEI).

Optionally, $X_1$ and $X_2$ are independently selected from the groups consisting of an alkyl group with carbon atoms of 1 to 5, a fluorine-containing alkyl group with carbon atoms of 1 to 5, a phenyl group, a tolyl group, and trifluoromethylbenzene group, naphthyl group, benzoyl group. The optional $X_1$ and $X_2$ groups have suitable space structure and good reactivity with the positive and negative electrodes, which is beneficial to form a low-impedance SEI film on the positive and negative electrodes, improve the low-temperature characteristics and power characteristics of the lithium-ion battery, and inhibit oxidative decomposition of electrolyte in the positive electrode and improves the high-temperature storage performance of the lithium-ion battery. On this basis, it is also possible to introduce heteroatoms into $X_1$ and $X_2$, and $X_1$ and $X_2$ includes but not limited to the organic groups containing atoms such as Si, N, S, and O. Among them, the introduction of silicon atoms can strengthen the effect of "hydrolysis or polymerization reaction with HF and $H_2O$ containing active proton hydrogen in the electrolyte to achieve the purpose of removing $H_2O$ and suppressing HF, thereby improving the thermal stability of $LiPF_6$".

The alkyl group with carbon atoms of 1 to 5 includes, but not limited to, methyl, ethyl, propyl, butyl, and pentyl. In order to avoid excessive steric hindrance, when $X_1$ and $X_2$ are both alkyl groups with carbon atoms of 3 or more, a linear alkyl group having a low degree of branching is preferred.

The fluorine-containing alkyl group with carbon atoms of 1 to 5 includes but not limited to, fluorine-containing methyl groups, fluorine-containing ethyl groups, fluorine-containing propyl groups, fluorine-containing butyl groups, fluorine-containing pentyl groups, which may specifically be trifluoromethyl and trifluoroethyl. In order to avoid excessive steric hindrance, when $X_1$ and $X_2$ are both fluorine-containing alkyl groups with carbon atoms of 3 or more, it is preferable to select a linear fluorine-containing alkyl group with a low degree of branching.

Particularly optionally, the formula II is at least one compound selected from the following structures:

The optional compound as shown in formula II is an additive of lithium ion battery electrolyte, which has a more excellent effect in improving the cycle performance, high temperature storage performance and low temperature discharge performance of lithium ion battery.

Correspondingly, the embodiment of the present application provides a lithium ion battery electrolyte, the electrolyte includes a non-aqueous organic solvent, a lithium salt and an additive, the additive is the additive for a battery electrolyte above. Specifically, the additive for a battery electrolyte at least includes the below structure shown in formula I or the structure as shown in formula II, Formula I Formula II In formula I, $R_1$ and $R_2$ are independently selected from silicon-containing groups, and X is selected from organic groups with carbon atoms of 2 to 20;

In formula II, $R_1$ and $R_2$ are independently selected from silicon-containing groups, and $X_1$ and $X_2$ are independently selected from organic groups with carbon atoms of 2 to 20.

The lithium ion battery electrolyte provided by the embodiment of the present application includes at least additive of the structure shown in formula I or formula II. The structures shown in formula I and formula II contain an imidazolone structure (one N atom is attached to each side of the carbonyl carbon). On the one hand, the carbonyl group in the imidazolone structure can react with $PF_5$ (a decomposition product of $LiPF_6$), which can preferentially reduce to form a low-impedance SEI film on the negative electrode to improve the low-temperature characteristics and power characteristics of lithium-ion battery; on the other hand, the N atom in the imidazolone structure contains a lone pair of electrons, and it is easy to lose electrons at the positive electrode and oxidize into a protective film, inhibit the oxidative decomposition of the electrolyte at the positive electrode, and improve the high-temperature storage performance of the lithium ion battery. In addition, the silicon-containing groups in $R_1$ and $R_2$ can undergo hydrolysis or polymerization with HF and $H_2O$ containing active proton hydrogen in the electrolyte to achieve the purpose of removing $H_2O$ and suppressing HF, thereby increasing the thermal stability of $LiPF_6$, improve battery high temperature performance. In summary, the lithium ion battery electrolyte provided by the present application and containing at least the additive of the structure shown in formula I or formula II can form a low-impedance protective film on the surface of the electrodes (positive electrode and negative electrode), which can prevent the electrode and electrolyte from side reaction, reduce the interface impedance, achieve both high and low temperature performance (with good low temperature discharge performance, as well as good cycle performance and high temperature storage performance), and improve the overall output performance of lithium-ion batteries.

The components of the lithium ion battery electrolyte are described in detail below.

Non-Aqueous Organic Solvent

Since water has a certain influence on the formation of lithium ion battery SEI and battery performance, specifically, the battery capacity becomes smaller, the discharge time becomes shorter, the internal resistance increases, the cycle capacity decay, battery expansion, etc. The embodiment of the present application uses a non-aqueous organic solvent as the solvent component of the electrolyte.

Optionally, the non-aqueous organic solvent includes at least one selected from ethylene carbonate, propylene carbonate, butylene carbonate, dimethyl carbonate, diethyl carbonate, ethyl methyl carbonate, methyl propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, ε-caprolactone. The addition of the preferred non-aqueous organic solvent can improve overall performance of the lithium ion secondary battery.

Furthermore, the total mass percentage of the non-aqueous organic solvent is 55% to 75% based on the total mass of the electrolyte as 100%.

Lithium Salt

In the embodiments of the present application, the lithium salt may be selected from commonly used lithium salts for lithium ion battery, including but not limited to one or more selected from lithium hexafluorophosphate, lithium perchlorate, lithium tetrafluoroborate, lithium borate bisoxalate, lithium borate difluorooxalate, and lithium bi-(trisfluoromethyl sulfonyl)imide and lithium bisfluorosulfonimide. Further, the amount of the lithium salt accounts for 10% to 18% of the lithium ion secondary battery electrolyte by mass.

Additive

In the embodiments of the present application, the additive is mainly used to improve film-forming performance during the first charge and discharge.

Formula I is a cyclic structure and formula II is a linear structure, but both formulas contain an imidazolone structure. In addition, $R_1$ and $R_2$ in the structures shown in formula I and formula II are independently selected from silicon-containing groups, thereby ensuring the realization of the above technical effects.

Optionally, the silicon-containing group is a silane group. Specifically, the $R_1$ and $R_2$ are independently selected from trimethylsilyl and t-butyldimethylsilyl. $R_1$ and $R_2$ are selected from additives of trimethylsilyl and t-butyldimethylsilyl, which have more excellent effects in improving the cycle performance, high temperature storage performance and low temperature discharge performance of lithium ion battery.

In the formula I of the embodiment of the present application, X is selected from organic groups with carbon atoms of 2 to 20. On the one hand, X is an organic group that does not generate active protons, thus avoiding the impact of protons on battery performance; on the other hand, organic groups with carbon atoms of 2 to 20 have a suitable molecular structure size and good compatibility with non-aqueous organic solvent. If X has too many carbon atoms, it will not only reduce its dissolution performance, but because of too large steric hindrance, it will also cover part of the reaction site, increase the difficulty of the reaction, reduce the reaction activity, and ultimately, affect the formation of solid electrolyte interphase film (SEI).

Optionally, X is selected from methylene-containing organic groups with carbon atoms of 2 to 6, carbonyl-containing organic groups with carbon atoms of 2 to 20, benzene-containing groups with carbon atoms of 6 to 20, and heteroatom containing organic group with carbon atoms of 2 to 20. The optional X group has a suitable space structure and good reactivity with the positive and negative electrodes, which is beneficial to form a low-impedance SEI film on the positive and negative electrodes, improve the low-temperature characteristics and power characteristics of the lithium ion battery, and suppress the oxidative decomposition of positive electrodes and improves the high-temperature storage performance of lithium-ion battery. The methylene-containing organic groups with carbon atoms of 2 to 6 include but not limited to $-(CH_2)_n-$, where the value of n is a positive integer of 1 to 6; the carbonyl-containing organic groups with carbon atoms of 2 to 20 include but not limited to $-C(CH_3)_2CO-$, $-(CH_2)CO-$, $-PhCO-$, $-Ph(CH_2)_1CO-$, $-C(C_2H_5)_2CO-$, $-COC(C_3H_7)(C_3H_5)CO-$, $-C(Ph)[PhOSi(CH_3)_2]CO-$, $-COC(C_3H_7)(C_2H_5)CO-$, $-COC(C_4H_9)(C_3H_5)CO-$, $-COC(C_5H_{11})(C_2H_5)CO-$, $-COC(Ph)(C_2H_5)CO-$, where the value of n is a positive integer of 1-6; the phenyl-containing organic group with carbon atoms of 6 to 20 includes but is not limited to $-PhCO-$, $-Ph(CH_2)_nCO-$, $-C(Ph)[PhOSi(CH_3)_2]CO-$, $-COC(Ph)(C_2H_5)CO-$, where the value of n is a positive integer of 1-6; the heteroatom-containing organic group carbon atoms of 2 to 20 includes but not limited to $-C(Ph)[PhOSi(CH_3)_2]CO-$, or organic groups containing N, S and O. Among them, the introduction of silicon atoms can strengthen the effect of "hydrolysis or polymerization reaction with HF and $H_2O$ containing active proton hydrogen in the electrolyte to achieve the purpose of removing $H_2O$ and suppressing HF, thereby improving the thermal stability of $LiPF_6$". Optionally, X is selected from $-(CH_2)_n-$, $-C(CH_3)_2CO-$, $-C(Ph)_2-$, $-CH_2CH=CHCH_2-$, —(CH$_2$)$_n$CO—, -PhCO—, -Ph(CH$_2$)$_n$CO—, —C(C$_2$H$_5$)$_2$CO—, —COC(C$_3$H$_7$)(C$_3$H$_5$)CO—, —C(Ph)[PhOSi(CH$_3$)$_2$]CO—, —COC(C$_3$H$_7$)(C$_2$H$_5$)CO—, —COC(C$_4$H$_9$)(C$_3$H$_5$)CO—, —COC(C$_5$H$_{11}$)(C$_2$H$_5$)CO—, and —COC(Ph)(C$_2$H$_5$)CO—, where the value of n is a positive integer from 1-6.

Specifically, the formula I is at least one compound selected from the following structures:

The optional compound as shown in formula I is an additive of lithium ion battery electrolyte and has a more excellent effect in improving the cycle performance, high temperature storage performance and low temperature discharge performance of lithium ion batteries.

In formula II of the embodiment of the present application, X$_1$ and X$_2$ are independently selected from organic groups with carbon atoms of 2 to 20. On the one hand, X$_1$ and X$_2$ are organic groups that do not generate active protons, thus avoiding the impact of protons on battery performance; on the other hand, organic groups with carbon atoms of 2 to 20 have a suitable molecular structure size, and good compatibility with non-aqueous organic solvent. If the number of carbon atoms of X$_1$ and X$_2$ is too large, it will not only reduce its dissolution performance, but because of large steric hindrance, it will also cover part of the reaction site, increase the difficulty of the reaction, reduce the reaction activity, and ultimately, affect the formation of solid electrolyte interphase film (SEI).

Optionally, X$_1$ and X$_2$ are independently selected from the group consisting of an alkyl group with carbon atoms of 1 to 5, a fluorine-containing alkyl group with carbon atoms of 1 to 5, a phenyl group, a tolyl group, trifluoromethylbenzene group, naphthyl group, benzoyl group. The optional X$_1$ and X$_2$ groups have suitable space structure and good reactivity with the positive and negative electrodes, which is beneficial to form a low-impedance SEI film on the positive and negative electrodes, improve the low-temperature character- istics and power characteristics of the lithium-ion battery, and inhibit the oxidative decomposition of the electrolyte in the positive electrode and improve the high-temperature storage performance of the lithium-ion battery. On this basis, it is also possible to introduce heteroatoms into $X_1$ and $X_2$, and $X_1$ and $X_2$ include but not limited to the organic groups with atoms such as Si, N, S, and O. Among them, the introduction of silicon atoms can strengthen the effect of "hydrolysis or polymerization reaction with HF and $H_2O$ containing active proton hydrogen in the electrolyte to achieve the purpose of removing $H_2O$ and suppressing HF, thereby improving the thermal stability of $LiPF_6$".

The alkyl group with carbon atoms of 1 to 5 includes but not limited to, methyl, ethyl, propyl, butyl, and pentyl. In order to avoid excessive steric hindrance, when $X_1$ and $X_2$ are both alkyl groups with carbon atoms of 3 or more, a linear alkyl group with a low degree of branching is preferably selected.

The fluorine-containing alkyl group with carbon atoms of 1 to 5 includes but not limited to, fluorine-containing methyl groups, fluorine-containing ethyl groups, fluorine-containing propyl groups, fluorine-containing butyl groups, and fluorine-containing pentyl groups, which may specifically be trifluoromethyl groups and trifluoroethyl. In order to avoid excessive steric hindrance, when $X_1$ and $X_2$ are both fluorine-containing alkyl groups with carbon atoms of 3 or more, it is preferable to select a linear fluorine-containing alkyl group with a low degree of branching.

Specifically, the formula II is at least one compound selected from the following structures:

The optional compound as shown in formula II is an additive of lithium ion battery electrolyte and has a more excellent effect in improving the cycle performance, high temperature storage performance and low temperature discharge performance of lithium ion battery.

Based on the above embodiments, it is further optional that the total mass percentage of the formula I and formula II is 0.05% to 2% based on the total mass of the electrolyte as 100%. If the mass percentage of the compounds as shown in formula I and formula II is less than 0.05%, a stable protective film cannot be formed on the surface of the electrode, which cannot achieve improving effect of "inhibiting the side reaction between the electrode and the electrolyte and reducing the interface resistance, integratedly improve the output performance of the battery". In addition, if the mass percentage of the compounds as shown in formula I and formula II is less than 0.05%, it can not improve the low-temperature discharge performance of high nickel with silicon carbon system; if the mass percentage of the compound as shown in formula I and formula II is higher than 2%, the protective film formed on the surface of the electrode is too thick, the polarization of the battery is increased, and the battery performance is deteriorated.

In the embodiments of the present application, based on the compounds as shown in formula I and formula II as additives, other additives may be further added to optimize the performance of the lithium ion battery. Optionally, the additive further includes at least one compound selected from fluoroethylene carbonate, vinylene carbonate, 1,3-propane sultone, 1,4-butane sultone, 1,3-propene sultone, ethylene sulfate and propylene sulfate.

Furthermore, the total mass percentage of the additive is 15% or less, based on the total mass of the electrolyte as 100%. On this basis, the mass percentage of any optional additive (fluoroethylene carbonate, vinylene carbonate, 1,3-propane sultone, 1,4-butane sultone, 1,3-propene sultone, vinyl sulfate, propylene sulfate) alone accounts for 0.1% to 10% of the total mass of the electrolyte.

And an embodiment of the present application provides a lithium-ion battery. The lithium-ion battery includes a positive electrode, a negative electrode, a separator, and an electrolyte, and the electrolyte is the lithium-ion battery electrolyte described in the present application.

As the lithium ion secondary battery provided by the embodiment of the present application contains the lithium ion secondary battery electrolyte of the present application, it can significantly improve the cycle performance and low temperature discharge performance of the lithium ion battery, and improve the overall output performance of the lithium ion battery.

In the embodiment of the present application, the composition of the electrolyte, the selection, content, optional type and selection basis of each component are as described above. In order to save space, it will not be repeated here.

The positive electrode includes a positive electrode active material, and the positive electrode active materials conventionally used in lithium ion battery can be used in the embodiments of the present application. However, optionally, the active material of the positive electrode is a transition metal oxide.

Specifically, the transition metal oxide is $LiNi_xCo_yMn_zL_{(1-x-y-z)}O_2$, where L is one selected from the group consisting of Al, Sr, Mg, Ti, Ca, Zr, Zn, Si, and Fe, The value of x, y, z satisfies: $0 \leq x < 1$, $0 < y \leq 1$, $0 \leq z < 1$, and $0 < x+y+z \leq 1$.

The negative electrode includes a negative electrode active material, and any negative electrode active material conventionally used in a lithium ion battery can be used in the embodiments of the present application. But optionally, the active material of the negative electrode is graphite, a composite material containing Si or lithium titanate.

The selection of the separator includes but not limited to, single-layer polyethylene (PE), single-layer polypropylene (PP), double-layer PP/PE, triple-layer PP/PE/PP, or ceramic separator.

The following is a description with reference to specific embodiments.

In each embodiment, the Chinese interpretation of the English abbreviation is explained as follows:

EC: Ethylene carbonate
EMC: Ethyl methyl carbonate
DMC: Dimethyl carbonate
$LiPF_6$: Lithium hexafluorophosphate
FEC: Fluoroethylene carbonate
DTD: Dioxathiolane 2,2-dioxide
PS: 3-propane sulfonolactone
PST: 1,3-propylene sulfonolactone In each embodiment, the structures of additives used and their corresponding reference numbers are shown in Table 1 below.

TABLE 1

| Additive | Reference No. | Structure Formula |
|---|---|---|
| Formula I | P1 |  |
| | P2 |  |
| | P3 |  |
| | P4 |  |
| | P5 |  |
| | P6 |  |
| | P7 |  |
| | P8 |  |

TABLE 1-continued

| Additive | Reference No. | Structure Formula |
|---|---|---|
| | P9 | |
| | P10 | |
| | P11 | |
| | P12 | |
| Formula II | P13 | |
| | P14 | |
| | P15 | |

Embodiment 1

A lithium ion secondary battery includes a positive electrode, a negative electrode, a separator, and an electrolyte, where the active material of the positive electrode is nickel-cobalt-manganese lithium (NCM811) material; the active material of the negative electrode is a silicon-carbon composite material (Si/C), the preparation method of the lithium ion secondary battery includes the following steps:

The positive electrode active material NCM811, conductive carbon black and binder polyvinylidene fluoride were mixed in a mass ratio of 96.8:2.0:1.2 and were dispersed into N-methyl-2-pyrrolidone to obtain positive electrode slurry. The positive electrode slurry is evenly coated on both sides of the aluminum foil, after being dried, rolled and vacuum dried, and the aluminum lead wire was welded with an ultrasonic welding machine to obtain a positive electrode plate (positive electrode sheet), the thickness of the electrode plate is between 100~115 μm;

The silicon-carbon composite materials, conductive carbon black, binder styrene-butadiene rubber and carboxymethyl cellulose were mixed in a mass ratio of 96:1:1.2:1.8, and were dispersed into deionized water to obtain a negative electrode slurry. The negative electrode slurry was coated on both sides of the copper foil, after being dried, calendered and vacuum dried, and the lead wire made of nickel was welded with an ultrasonic welding machine to obtain a negative electrode plate (negative electrode sheet), the thickness of the electrode plate was between 115~135 μm;

The ethylene carbonate (EC), ethyl methyl carbonate (EMC), and dimethyl carbonate (DMC) were mixed in a mass ratio of 2:1:7. After mixing, 12.5% lithium hexafluorophosphate and 1% P1 based on the total mass of the electrolyte were added to obtain the electrolyte.

A ceramic separator was prepared by coating $Al_2O_3$ on one side.

The prepared positive electrode sheet, separator and negative electrode sheet were put on the automatic winding machine to wind up to obtain a bare cell; the bare cell was placed in a cylindrical steel shell, the negative electrode tab and the cap tab were welded. The electrolyte prepared above was injected into the dried battery cell and was sealed, placed, pre-charged, aged and divided to complete the preparation of the lithium ion secondary battery (18650-3.0 Ah).

Embodiment 2 to Embodiment 35

In Embodiment 2 to Embodiment 26, except that the components of the electrolyte are different, the preparation of the positive electrode, negative electrode, separator, and lithium ion secondary battery are as the same as in Embodiment 1. The selection of the compound with structure shown in formula I in each embodiment and its content is shown in Table 2.

In Embodiment 27 to Embodiment 35, in order to further improve the overall output performance of the battery, a film-forming additive is added on the basis of the above Embodiment 1 to Embodiment 26, and the selection and content of each component are shown in Table 3.

Comparative Embodiment 1~Comparative Embodiment 5

In Comparative Embodiments 1 to 5, except for the types and contents of non-aqueous organic solvents and additives in the electrolyte (based on the total mass of the electrolyte), the preparation of the positive electrode, negative electrode, separator, and lithium ion secondary battery were as same as in Embodiment 1, the types and contents of non-aqueous organic solvents and additives in Comparative Embodiment 1 are shown in Table 2, and the types and contents of non-aqueous organic solvents and additives in Comparative Embodiments 2-4 are shown in Table 3.

The lithium ion secondary battery prepared in Embodiments 1 to 35 and Comparative Embodiments 1 to 5 were tested for performance. The test methods are as follows:

1) Linear sweep voltammetry (LSV)

Pt was used as working electrode, Li as counter electrode and reference electrode, a three-electrode device was assembled to perform linear scanning on an electrochemical workstation.

2) Cycle performance test: at temperature of 25±2° C./45° C.±° C., the divided battery was charged to 4.2V with 0.5 C constant current and constant voltage (cutoff current is 0.01 C), and then discharge with 1 C constant current to 2.75V. The N-cycle capacity retention rate is calculated after N cycles of charge/discharge. The calculation formula is as follows:

$N_{th}$ cycle capacity retention rate (%)=($N_{th}$ cycle discharge capacity/1st cycle discharge capacity)×100%;

3) High-temperature storage performance: the divided battery was charged to 4.2V at room temperature with constant current and constant voltage under 0.5 C (cut-off current is 0.01 C), the initial discharge capacity of the battery was measured, and then the battery was stored at 60° C. for 7 days and was discharged to 2.75V under 0.5 C to measure the retention capacity and recovery capacity of the battery. Calculated formulas were as follows:

Battery capacity retention rate (%)=retention capacity/initial capacity×100%;

Battery capacity recovery rate (%)=recovery capacity/initial capacity×100%.

4) Low temperature discharge: charge to 4.2V at a constant current and constant voltage at 0.5 C at room temperature, place for 5 min, and discharge to 2.75V at 0.2 C, and check the initial capacity of the battery. Place it for 5 minutes, and charge to 4.2V with constant current and constant voltage (cutoff current is 0.01 C) at 0.5 C. Put the battery in a low temperature box at −20° C. and place it for 6 hours. Under this condition, discharge to 2.75V at 0.2 C, and measure the discharge capacity at low temperature.

Low temperature discharge retention rate (%)=low temperature discharge capacity/initial capacity×100%.

The test results are shown in Table 2 and Table 3 below.

TABLE 2

| Embodiment | Solvent and lithium salt | Formula I/ Formula II (wt %) | Retention rate at 45° C. with 200 cycles (%) | Retention rate at 45° C. with 400 cycles (%) | 60° C. @ 7 d storage Battery capacity retention rate (%) | 60° C. @ 7 d storage Battery capacity recovery rate (%) | Discharge retention rate at −20° C. (%) |
|---|---|---|---|---|---|---|---|
| Embodiment1 | EC/EMC/DMC = 2/1/7 1M LiPF$_6$ | 1% P1 | 83.9% | 82.7% | 80.1% | 86.7% | 77.3% |
| Embodiment2 | EC/EMC/DMC = 2/1/7 1M LiPF$_6$ | 0.05% P1 | 75.1% | 71.6% | 71.6% | 77.9% | 71.5% |
| Embodiment3 | EC/EMC/DMC = 2/1/7 1M LiPF$_6$ | 0.5% P1 | 80.2% | 78.9% | 79.8% | 85.6% | 77.1% |
| Embodiment4 | EC/EMC/DMC = 2/1/7 1M LiPF$_6$ | 2% P1 | 76.1% | 75.75 | 78.6% | 84.8% | 75.7% |
| Embodiment5 | EC/EMC/DMC = 2/1/7 1M LiPF$_6$ | 1% P2 | 84.1% | 83.6% | 81.2% | 87.1% | 76.9% |
| Embodiment6 | EC/EMC/DMC = 2/1/7 1M LiPF$_6$ | 1% P3 | 81.9% | 80.5% | 80.9% | 86.2% | 76.8% |
| Embodiment7 | EC/EMC/DMC = 2/1/7 1M LiPF$_6$ | 1% P4 | 85.1% | 82.8% | 82.1% | 88.1% | 72.1% |
| Embodiment8 | EC/EMC/DMC = 2/1/7 1M LiPF$_6$ | 1% P5 | 83.9% | 82.1% | 81.6% | 87.0% | 72.6% |
| Embodiment9 | EC/EMC/DMC = 2/1/7 1M LiPF$_6$ | 1% P6 | 82.7% | 79.7% | 80.2% | 85.8% | 74.6% |

TABLE 2-continued

| Embodiment | Solvent and lithium salt | Formula I/ Formula II (wt %) | Retention rate at 45° C. with 200 cycles (%) | Retention rate at 45° C. with 400 cycles (%) | 60° C. @ 7 d storage Battery capacity retention rate (%) | 60° C. @ 7 d storage Battery capacity recovery rate (%) | Discharge retention rate at −20° C. (%) |
|---|---|---|---|---|---|---|---|
| Embodiment10 | EC/EMC/DMC = 2/1/7 1M LiPF$_6$ | 1% P7 | 81.7% | 78.6% | 80.5% | 86.0% | 72.8% |
| Embodiment11 | EC/EMC/DMC = 2/1/7 1M LiPF$_6$ | 1% P8 | 83.1% | 82.7% | 81.8% | 87.1% | 75.6% |
| Embodiment12 | EC/EMC/DMC = 2/1/7 1M LiPF$_6$ | 1% P9 | 83.8% | 81.9% | 80.8% | 87.0% | 78.1% |
| Embodiment13 | EC/EMC/DMC = 2/1/7 1M LiPF$_6$ | 1% P10 | 81.6% | 83.7% | 77.1% | 83.6% | 80.1% |
| Embodiment14 | EC/EMC/DMC = 2/1/7 1M LiPF$_6$ | 1% P11 | 82.5% | 83.1% | 76.9% | 83.1% | 79.7% |
| Embodiment15 | EC/EMC/DMC = 2/1/7 1M LiPF$_6$ | 1% P12 | 83.6% | 84.9% | 78.1% | 83.9% | 80.2% |
| Embodiment16 | EC/EMC/DMC = 2/1/7 1M LiPF$_6$ | 1% P13 | 81.1% | 82.7% | 77.0% | 82.6% | 77.8% |
| Embodiment17 | EC/EMC/DMC = 2/1/7 1M LiPF$_6$ | 1% P14 | 85.6% | 86.1% | 80.9% | 86.1% | 79.7% |
| Embodiment18 | EC/EMC/DMC = 2/1/7 1M LiPF$_6$ | 1% P15 | 80.1% | 81.5% | 81.5% | 86.7% | 76.1% |
| Embodiment19 | EC/EMC/DMC = 2/1/7 1M LiPFI | 1% P1 | 85.1% | 83.8% | 81.2% | 87.7% | 80.8% |
| Embodiment20 | EC/EMC/DMC = 2/1/7 1M LiTFSI | 1% P1 | 84.7% | 83.1% | 80.9% | 87.1% | 72.6% |
| Embodiment21 | EC/EMC/DMC = 2/1/7 0.25M LiFSI 0.75M LiPF$_6$ | 1% P1 | 86.8% | 85.1% | 82.6% | 88.6% | 80.1% |
| Embodiment22 | EC/EMC/DMC = 2/1/7 1M LiPF$_6$ | 0.3% P1 1% P11 | 84.6% | 83.8% | 81.2% | 87.6% | 76.7% |
| Embodiment23 | EC/EMC/DMC = 2/1/7 1M LiPF$_6$ | 0.5% P1 0.5% P14 | 87.1% | 85.7% | 85.2% | 90.7% | 80.1% |
| Embodiment24 | EC/EMC/DMC = 2/1/7 1M LiPF$_6$ | 1% P1 | 81.8% | 80.6% | 79.7% | 85.6% | 78.6% |
| Embodiment25 | EC/EMC/DMC = 2/1/7 1M LiPF$_6$ | 1% P1 | 82.3% | 81.1% | 80.6% | 85.8% | 79.7% |
| Embodiment26 | EC/EMC/DMC = 2/1/7/6 1M LiPF$_6$ | 1% P1 | 82.7% | 81.8% | 80.7% | 86.1% | 79.1% |
| Comparative Embodiment1 | EC/EMC/DMC = 2/1/7 1M LiPF$_6$ | / | 58.6% | 60.1% | 51.6% | 60.8% | 70.6% |

The Embodiments 1-26 with battery system of NCM811 with silicon-carbon composite materials is compared with comparative embodiment 1 for comparative analysis. It can be seen from Table 2 that Embodiment 1 to Embodiment 26 adopting the technical scheme of the present application have good cycle performance, high-temperature storage performance and low-temperature discharge performance; while the lithium ion battery using the electrolyte of comparative embodiment 1 has poor output performance and cannot achieve high/low temperature and cycle performance simultaneously.

Specifically, comparing each embodiment with Comparative Embodiment 1, Embodiment 1 to Embodiment 26 contain compounds with structure of formula I/II, the low-temperature discharge performance, high-temperature cycle, normal-temperature cycle and high-temperature storage performance of each Embodiment are significantly better than Comparative Embodiment 1. It was clearly shown that the existence of P1, P2, P3, P4, P5, P6, P7, P8, P9, P10, P11, P12, P13, P14, P15, P1+P11, P2+P14, can effectively improve the overall output performance of the battery.

Figure 1:
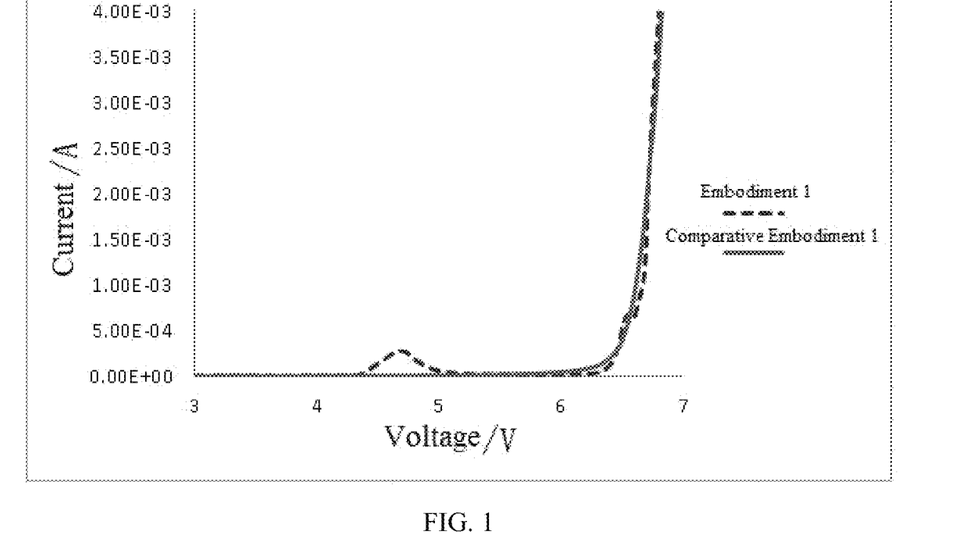
FIG. 1 is a linear scanning voltammetry (LSV) curve provided by embodiment 1 of the present application and comparative embodiment 1.
Figure 2:
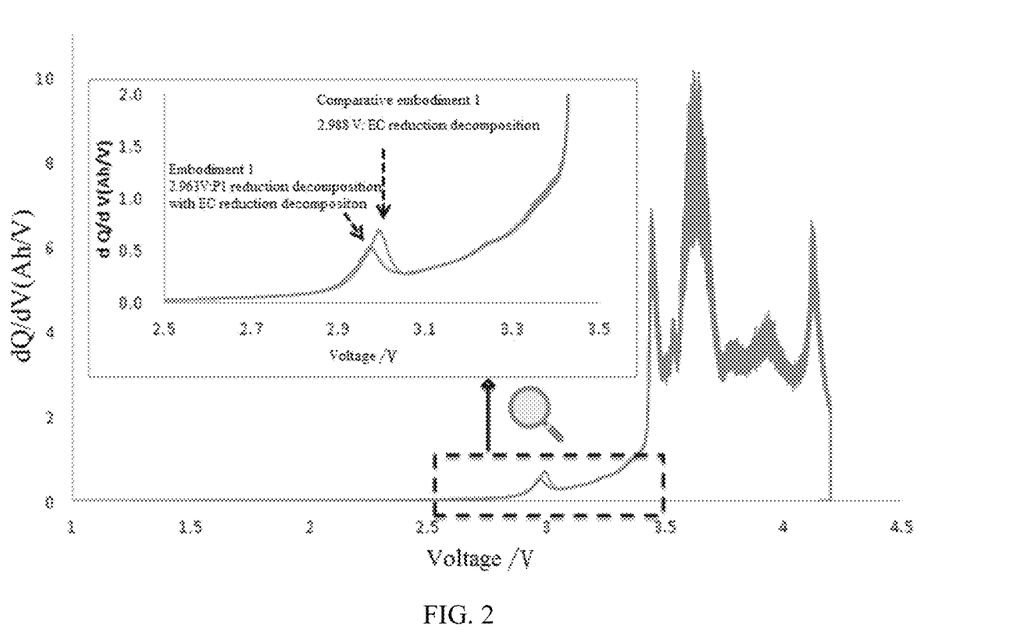
FIG. 2 is an analysis diagram of a capacity voltage differential curve (dQ/dV~V) provided by embodiment 1 of the present application and comparative embodiment 1.

Using the electrolyte of Comparative Embodiment 1 and Embodiment 1, LSV evaluation and capacity differential curve (dQ/dV~V) analysis were performed and the results are shown in FIG. 1 and FIG. 2. It can be seen from FIG. 1 that the oxidation peak of the sample containing P1 appeared in advance, implying that the additive preferentially oxidizes with other solvents, further illustrating that P1 is easily oxidized at the positive electrode to form a protective film, which suppresses the side reaction between the electrolyte and the high nickel material. It can be seen from FIG. 2 that comparing to EC, the sample containing P1 on negative electrode preferentially reduces, and the reduction decomposition of EC of the sample containing P1 was suppressed, which showed that the intensity of the peak decreased. According to the structure of d Q/dV~V and LSV, it can be known that P1 can form a film on the positive and negative electrodes.

present application also have better cycle performance, high temperature storage and low temperature discharge performance; the output performance of the battery with electrolyte of comparative embodiments 2-5 is poor, and can't achieve the high and low temperature and cycle performance simultaneously.

In summary, through the comparison of each embodiment with the comparative embodiment, it is found that the embodiment of the present application forms a protective film on the positive and negative electrode by adding the compound with structure of formula I and formula II, so that a lithium ion secondary battery containing this non-aqueous electrolyte can obtain a good output performance. This

TABLE 3

| Embodiment | Solvent/ lithium salt | Formula I compound (wt %) | Retention rate at 45° C. with 800 cycles (%) | Retention rate at 25° C. with 1000 cycles (%) | 60° C. @ 7 d storage Battery capacity retention rate (%) | 60° C. @ 7 d storage Battery capacity recovery rate (%) | Discharge retention rate at −20° C. (%) |
|---|---|---|---|---|---|---|---|
| Embodiment27 | EC/EMC/ DMC = 2/1/7 1M LiPF$_6$ | 1% P1 8% FEC | 80.1% | 817% | 90.2% | 94.6% | 79.1% |
| Embodiment28 | EC/EMC/ DMC = 2/1/7 1M LiPF$_6$ | 1% P1 8% FEC 1% PS | 83.8% | 83.5% | 91.5% | 95.7% | 76.6% |
| Embodiment29 | EC/EMC/ DMC = 2/1/7 1M LiPF$_6$ | 1% P1 8% FEC 0.5% PST | 85.1% | 84.6% | 92.8% | 96.8% | 73.8% |
| Embodiment30 | EC/EMC/ DMC = 2/1/7 1M LiPF$_6$ | 1% P1 8% FEC 1% DTD | 85.6% | 85.1% | 93.1% | 97.2% | 82.2% |
| Embodiment31 | EC/EMC/ DMC = 2/1/7 1M LiPF$_6$ | 1% P11 8% FEC | 78.1% | 80.6% | 89.1% | 93.3% | 81.8% |
| Embodiment32 | EC/EMC/ DMC = 2/1/7 1M LiPF$_6$ | 1% P11 8% FEC 1% PS | 81.7% | 82.1% | 90.3% | 94.6% | 80.1% |
| Embodiment33 | EC/EMC/ DMC = 2/1/7 1M LiPF$_6$ | 1% P11 8% FEC 0.5% PST | 83.8% | 83.7% | 91.2% | 95.3% | 76.1% |
| Embodiment34 | EC/EMC/ DMC = 2/1/7 1M LiPF$_6$ | 1% P11 8% FEC 1% DTD | 84.7% | 83.9% | 92.7% | 95.8% | 83.1% |
| Embodiment35 | EC/EMC/ DMC = 2/1/7 1M LiPF$_6$ 0.25 MLiFSI | 1% P11 8% FEC 1% DTD | 85.1% | 84.6% | 92.8% | 96.1% | 83.5% |
| Comparative Embodiment2 | EC/EMC/ DMC = 2/1/7 1M LiPF6 | 8% FEC | 28.1% | 31.7% | 61.5% | 70.1% | 71.9% |
| Comparative Embodimen3 | EC/EMC/ DMC = 2/1/7 1M LiPF6 | 8% FEC 1% PS | 57.6% | 61.1% | 66.5% | 73.9% | 70.7% |
| Comparative Embodimen4 | EC/EMC/ DMC = 2/1/7 1M LiPF6 | 8% FEC 0.5% PST | 58.1% | 60.7% | 75.1% | 83.7% | 65.6% |
| Comparative Embodiment 5 | EC/EMC/ DMC = 2/1/7 1M LiPF6 | 8% FEC 1% DTD | 60.1% | 62.6% | 76.8% | 85.7% | 71.7% |

In the Embodiment 27 to Embodiment 35 of Table 3, in order to further improve the overall output performance of the battery, a film-forming additive is added on the basis of the above Embodiment 1 to Embodiment 26: fluorocarbonate, 1,3-propane sultone, 1,3-propylene sulfonolactone, Dioxathiolane 2,2-dioxide.

It can be seen from Table 3 that Embodiment 27 to Embodiment 35 containing compounds with structure of formula I/formula II shown in the technical scheme of the technical scheme is applied to high nickel of positive electrode with silicon carbon composite of negative electrode system, which has obvious improvement effect.

The above is only the preferred embodiment of the present application and is not intended to limit the present application. Any modification, equivalent replacement and improvement made within the spirit and principle of the present application should be included in the scope of the present application.

What is claimed is:

1. An additive for a battery electrolyte, the additive comprising at least a structure represented by formula I or formula II as shown below, Formula I Formula II wherein in formula I, $R_1$ and $R_2$ are independently selected from silicon-containing groups, and X is selected from organic groups with 2 to 20 carbon atoms; and wherein in formula II, $R_1$ and $R_2$ are independently selected from silicon-containing groups;

wherein $X_1$ and $X_2$ are independently selected from an alkyl group with 1 to 5 carbon atoms, a fluoroalkyl with 1 to 5 carbon atoms, phenyl, tolyl, trifluoromethylphenyl, naphthyl, and benzoyl; and wherein $X_1$ and $X_2$ are not simultaneously selected from the alkyl group with 1 to 5 carbon atoms.

2. The additive for a battery electrolyte according to claim 1, wherein $R_1$ and $R_2$ are independently selected from trimethylsilyl and t-butyldimethylsilyl.

3. The additive for a battery electrolyte according to claim 1, wherein X is selected from methylene-containing organic groups with 2 to 6 carbon atoms, carbonyl-containing organic groups with 2 to 20 carbon atoms, phenyl-containing organic groups with 6 to 20 carbon atoms, and heteroatom-containing organic groups with 2 to 20 carbon atoms.

4. The additive for a battery electrolyte according to claim 3, wherein X is selected from —(CH$_2$)$_n$—, —C(CH$_3$)$_2$CO—, —C(Ph)$_2$-, —CH$_2$CH═CHCH$_2$—, —(CH$_2$)$_n$CO—, -PhCO—, -Ph(CH$_2$)$_n$CO—, —C(C$_2$H$_5$)$_2$CO—, —COC(C$_3$H$_7$)(C$_3$H$_5$)CO—, —C(Ph)[PhOSi(CH$_3$)$_2$]CO—, —COC(C$_3$H$_7$)(C$_2$H$_5$)CO—, —COC(C$_4$H$_9$)(C$_3$H$_5$)CO—, —COC(C$_5$H$_{11}$)(C$_2$H$_5$)CO—, and —COC(Ph)(C$_2$H$_5$)CO—, in which the value of n is a positive integer of 1-6.

5. The additive for a battery electrolyte according to claim 1, wherein the formula I is at least one compound selected from the following structures:

-continued

, and

6. The additive for a battery electrolyte according to claim 1, wherein the formula II is at least one compound selected from the following structures:

, and

-continued

7. A lithium ion battery electrolyte, wherein the electrolyte comprises a non-aqueous organic solvent, a lithium salt, and an additive, wherein the additive is the additive for a battery electrolyte according to claim 1.

8. The lithium ion battery electrolyte according to claim 7, wherein the sum of the mass percentages of the formula I or the formula II is 0.05% to 2% based on the total mass of the electrolyte as 100%.

9. The lithium ion battery electrolyte according to claim 7, wherein the additive further comprises at least one selected from fluoroethylene carbonate, vinylene carbonate, 1,3-propane sulfone of lactone, 1,4-butane sulfone of lactone, 1,3-propene sulfone of lactone, vinyl sulfate, and allyl sulfate.

10. The lithium ion battery electrolyte according to claim 9, wherein the sum of the mass percentage of the additive is less than or equals to 15% based on the total mass of the electrolyte as 100%.

11. The lithium ion battery electrolyte according to claim 7, wherein the non-aqueous organic solvent comprises at least one selected from ethylene carbonate, propylene carbonate, butylene carbonate, dimethyl carbonate, diethyl carbonate, ethyl methyl carbonate, methyl propyl carbonate, methyl acetate, ethyl acetate, propyl acetate, methyl propionate, ethyl propionate, propyl propionate, methyl butyrate, ethyl butyrate, γ-butyrolactone, γ-valerolactone, δ-valerolactone, and ε-caprolactone.

12. The lithium ion battery electrolyte according to claim 11, wherein the sum of mass percentage of the non-aqueous organic solvent is 55% to 75% based on the total mass of the electrolyte as 100%.

13. A lithium ion battery, wherein the lithium ion battery comprises a positive electrode, a negative electrode, a separator, and an electrolyte, and the electrolyte is the lithium ion battery electrolyte according to claim 7.

14. The lithium ion battery according to claim 13, wherein an active material of the positive electrode is a transition metal oxide; an active material of the negative electrode is graphite, a composite material containing Si, or lithium titanate.

15. The lithium ion battery according to claim 14, wherein the transition metal oxide is $LiNi_xCo_yMn_zL_{(1-x-y-z)}O_2$, wherein L is one selected from the group consisting of Al, Sr, Mg, Ti, Ca, Zr, Zn, Si and Fe, the values of x, y and z satisfy: $0 \leq x<1$, $0<y \leq 1$, $0 \leq z<1$, and $0<x+y+z \leq 1$.

* * * * *